United States Patent [19]

Brown

[11] 4,154,787

[45] May 15, 1979

[54] METHOD FOR MANUFACTURING SILICON CARBIDE BODIES

[75] Inventor: Wendel G. Brown, Broomfield, Colo.

[73] Assignee: Coors Porcelain Company, Golden, Colo.

[21] Appl. No.: 921,402

[22] Filed: Jul. 3, 1978

Related U.S. Application Data

[63] Continuation-in-part of Ser. No. 819,025, Jul. 25, 1977, abandoned.

[51] Int. Cl.$^2$ .................... C04B 35/70; C04B 37/00; C01B 31/36
[52] U.S. Cl. ........................................ 264/60; 264/63; 264/65; 264/101; 106/44; 106/73.5; 423/345
[58] Field of Search ................. 423/345; 106/44, 73.5; 264/29.5, 29.6, 60, 63, 65, 101

[56] References Cited

U.S. PATENT DOCUMENTS

| | | | |
|---|---|---|---|
| 3,205,043 | 9/1965 | Taylor | 423/345 |
| 3,480,395 | 11/1969 | McMullen et al. | 423/345 |
| 3,882,210 | 5/1975 | Crossley et al. | 423/345 X |
| 3,947,550 | 3/1976 | Fitchmun | 423/345 |
| 4,117,057 | 9/1978 | Yajima et al. | 264/63 |

*Primary Examiner*—Jack Cooper
*Attorney, Agent, or Firm*—Reising, Ethington, Barnard, Perry & Brooks

[57] ABSTRACT

In accordance with the invention there is provided a method for manufacturing a reaction bonded silicon carbide body by heating, in a vacuum or an inert atmosphere, to at least the melting temperature of elemental silicon, a porous compact consisting essentially of a substantially uniform mixture of silicon carbide grain and finely divided carbon while said compact is in intimate surface-to-surface contact with a mixture of finely divided elemental silicon and a small amount of finely divided, uniformly distributed carbon, such silicon-carbon mixture preferably also being in the form of a compact. Upon such heating, a portion of the elemental silicon in the silicon-carbon mixture reacts with the carbon therein to form a friable, highly porous matrix of silicon carbide which functions to guide the flow of the remaining elemental silicon into the porous silicon carbide-carbon compact where it reacts with the carbon therein to form additional silicon carbide thereby to convert the compact to a reaction bonded silicon carbide body.

14 Claims, No Drawings

METHOD FOR MANUFACTURING SILICON CARBIDE BODIES

This is a continuation-in-part of U.S. Pat. Application Ser. No. 819,025, filed July 25, 1977, now abandoned.

The subject matter of the present invention is an improved method for manufacturing, at relatively low cost, reaction bonded silicon carbide bodies which are of superior The invention will be described largely with reference to the manufacture of silicon carbide seal rings though it will be understood that the method can be used for the manufacture of bodies for numerous other uses.

It is already known that silicon carbide seal rings used, for example, in sealing the rotary shafts of slurry pumps and the like, are advantageous because of the hardness, and hence great wear resistance, the high thermal conductivity, and the high thermal shock resistance of the silicon carbide. To optimize these properties it is desirable that such seal rings be of high density, and hence low porosity. Of course, it is also desirable that they be manufactured at low cost so that the end user does not have to pay an excessive premium for using such seal rings as compared with seal rings of other materials.

It is known that silicon carbide seal rings can be manufactured by first making a ring-shaped compact of silicon carbide and carbon and then permeating this compact with silicon, either in vapor or liquid form, such that the silicon reacts with the carbon in the compact to form additional silicon carbide in situ, the amount of silicon used being that stoichiometrically necessary to react with all of the carbon in the compact. Such bodies are referred to as being of reaction bonded silicon carbide. However, it is difficult to attain a substantially non-porous structure using such techniques. Further, the subsequent cutting and machining operations to accomplish the required dimensions and smooth surface finish for the individual seal rings are difficult, and hence expensive, because of the extreme hardness of silicon carbide.

The present invention provides a method for manufacturing reaction bonded silicon carbide seal rings which are substantially non-porous and yet which can be made at relatively low cost by reason of the relatively easy machinability of the seal ring surfaces to smooth finish subsequent to silicon impregnation of the silicon carbide-carbon compact and also by reason of the elimination of stringent composition control and other control measures heretofore necessary.

Briefly, and with reference to the manufacture of seal rings, the method of the present invention in its preferred form comprises forming an assembly of a porous silicon carbide-carbon ring-shaped compact in axial face-to-axial face intimate contact with a ring-shaped compact predominantly of finely divided elemental silicon but also containing finely divided carbon uniformly distributed therethrough, such assembly thereafter being heated to the melting temperature of the silicon. The amount of elemental silicon in the last-mentioned compact is greater than required to react with all the carbon in both compacts. As the silicon reaches its melting temperature a portion thereof reacts with the carbon with which it is mixed thereby to form silicon carbide which provides a highly porous, friable matrix. This highly porous matrix then functions to guide the flow of the molten silicon into the porous silicon carbide-carbon compact whereupon a portion of the molten silicon reacts with the carbon in that compact to form additional silicon carbide, a remaining portion of the molten silicon filling any voids between the silicon carbide grains thereby to provide a substantially non-porous body. After cooling, the friable silicon carbide and any excess of elemental silicon on the surface of the non-porous body can be easily removed, as by a machining or other abrading operation, this because of the friable nature of the porous silicon carbide matrix and the relative softness of the elemental silicon. Because the amount of silicon used is greater than that stoichiometrically required to react with all the carbon, there is no requirement for close control of the amount of silicon in the silicon-carbon compact, any excess being easily removable from the manufactured non-porous body for the reason aforesaid. By the same token, there is no requirement for stringent control of the porosity of the silicon carbide-carbon compact or of the precise amount of carbon therein since the use of excess elemental silicon in the silicon-carbon compact assures adequate quality control and non-porosity of the manufactured bodies. That is, minor variations, between the individual finished seal rings, in the amount of elemental silicon they contain has no significant effect on the quality and excellent performance characteristics of the seal rings. This, along with the ease of final machining operations to provide the precise size and surface finish desired, enables relatively low cost manufacture.

Other features, particulars and advantages of the invention will appear more clearly from the following more detailed description of the invention.

MATERIALS

The silicon carbide grain used as the starting material can be alpha silicon carbide of conventional commercial grade readily available in the market and with a grain size of anywhere from 200 to 1200 grit. It is preferred that the grain size be variated. Typical for use in the practice of the invention is 1000 grit size alpha silicon carbide, the particle size distribution being such that approximately 50% of the grains are of a size ranging upwardly from 10 microns to as high as 25 microns and with the remaining 50% ranging relatively uniformly down from 4 microns to as low as 0.5 microns—and hence, the average particle size of the grain being approximately 10 microns. As has been indicated, larger or smaller grain size silicon carbide can be used if desired.

The carbon for each of the compacts can be either amorphous carbon or graphite. The particle size of the carbon should preferably be submicron, a particle size distribution of from about 0.01 to 1 microns, and with an average particle size of 0.1 microns, being excellent.

The silicon used in the silicon-carbon compact can be of commercial grade, preferably with a particle size within the range of about 100 to 325 mesh, 200 mesh being typical. The particle size distribution in 200 mesh silicon powder is approximately 10 to 150 microns, the average particle size being about 75 microns.

In the formulation of the mixtures for making the compacts it is desirable to include an organic binder to insure that the compacts have good green strength and, hence, can be handled without danger of crumbling or breaking. Of course, substantially before the silicon reaches its melting temperature in the practice of the method of the invention, the organic binder decomposes to elemental carbon thereby providing a small amount of carbon in addition to that added as such to the mixtures from which the compacts are formed. Any of a wide variety of organic binders can be used, for example, the acrylic resins, polyvinyl butyral, cellulose acetate, methyl cellulose or polyethylene glycol. For simple, low cost manufacture it is desirable that the organic binder be water soluble, as will be clear from the further description of the method which follows.

FORMULATION AND PREPARATION OF THE COMPACTS

The mixture used for the silicon carbide-carbon compact should preferably contain from about 75 to 95 parts by weight silicon carbide, from about 5 to 25 parts by weight elemental carbon (i.e., either amorphous carbon or graphite) and from about 5 to 15 parts by weight organic binder. With such formulations, by the time the silicon becomes molten in the practice of the method (prior to which time the organic binder will have decomposed to carbon), the relative amounts of silicon carbide and carbon in the compact will be approximately from 70% to 95% by weight silicon carbide and from 5% to 30% by weight carbon. The upper end of the silicon carbide range and the lower end of the carbon range remain approximately the same as in the initial batch since, where only 5 parts by weight binder are use and where only a minor percentage of the binder molecule is carbon, the amount of carbon contributed by decomposition of the binder is insignificant. A typical batch formulation for forming the silicon carbide-carbon compact is: 80 parts by weight silicon carbide (1000 grit), 20 parts by weight carbon black, 10 parts by weight polyethylene glycol and 100 parts by weight water. In forming the mixture it is preferable that the water, polyethylene glycol and carbon first be mixed to form a slurry, and with the silicon carbide then being added to this slurry and mixed therewith. After such mixing the water is evaporated and the resulting material consists of silicon carbide grains coated with a mixture of the binder and the carbon. A measured amount of this coated loose granular silicon carbide material can then be pressed in matched metal dies to form the silicon carbide-carbon compact. Of course, the shape of the dies is selected to impart the desired shape to the compact, ring-shaped dies being used to form the compacts for making seal rings. Depending upon the particular binder selected, heat may or may not be necessary in the pressing operation to attain a compact having good green strength. Where polyethylene glycol is used as the binder, no heat is required.

In the pressing operation to form the silicon carbide-carbon compact, the amount of pressure applied should preferably be such as to result in the compact having a bulk density of from about 1.4 to 2.5 grams per cubic centimeter, 1.8 grams per cubic centimeter being typical. Where the bulk density of the compact is within the aforesaid range, the porosity of the compact is such that from about 20% to 50% by volume of the compact consists of voids between the coated grains of silicon carbide. These voids are uniformly distributed and communicate with each other. Depending upon the precise mixture used and the porosity desired, pressing pressure of from 3000 to 20,000 psi can be used.

The mixture for the silicon-carbon compact should preferably contain from about 90 to 97 parts by weight silicon, from about 3 to 10 parts by weight elemental carbon and from about 3 to 10 parts by weight binder. The carbon can be either amorphous carbon or graphite and the binder can be the same as that used in the silicon carbide-carbon compact. Just as discussed above with reference to the silicon carbide-carbon compact, so also in the silicon-carbon compact, by the time the silicon reaches its melting temperature the organic binder will have decomposed to provide a small amount of carbon in addition to that added as such. With mixture formulations within the aforesaid ranges, the relative amounts of silicon and carbon in the compact at the conclusion of the decomposition of the binder is approximately 87% to 97% by weight silicon and 3% to 13% by weight carbon. A typical mixture for making the silicon-carbon compact is: 94 parts by weight silicon (200 mesh), 6 parts by weight carbon black or graphite with an average particle size of about 0.1 micron, 5 parts by weight polyethylene glycol and 100 parts by weight water. The mixture is formed and then dried the same as described above with reference to the silicon carbide-carbon compact, and the resulting coated silicon powder can then be formed in matched metal dies into a compact of the shape desired. The pressure used for the pressing operation can be from 3000 to 20,000 pounds per square inch. The silicon-carbon compact can be pressed to high density, and hence without voids, though the presence of voids does no harm.

In the practice of the preferred embodiments the amount of silicon used in the silicon-carbon compact should be at least equal to, and preferably at least slightly in excess of that required to react with all the carbon in both compacts to form silicon carbide, plus the amount required to fill all the voids remaining between the silicon carbide after all the carbon in the silicon carbide-carbon compact has reacted to form silicon carbide. Hence, the greater the amount of carbon in the two compacts and the greater the porosity of the silicon carbide-carbon compact, the greater is the amount of silicon which should be used in the silicon-carbon compact.

PROCESSING OF THE COMPACTS TO FORM THE FINAL PRODUCT

An assembly is formed comprising a silicon carbide-carbon compact in surface-to-surface abutment with a silicon-carbon compact. For the manufacture of a seal ring, such assembly consists of a ring-shaped silicon carbide-carbon compact with a ring-shaped silicon-carbon compact laid on top therof in axial alignment therewith. The silicon-carbon ring should preferably be, though need not necessarily be, of the same internal and external diameter as the silicon carbide-carbon ring. The thickness of the silicon carbide-carbon ring is at least approximately, but not less than, that desired for the seal ring being made, and the thickness of the silicon-carbon ring is determined by the amount of silicon used in accordance with the factors discussed above.

Instead of forming the two compacts separately and then stacking one on top of the other to form the assembly, the two compacts can be formed as one unitary compact having a layer of silicon carbide-carbon and a layer of silicon-carbon. That is, the mixture used for the silicon carbide-carbon compact can be pressed to the desired shape in a set of matched metal dies and then, with the male die removed and with the silicon carbide-carbon compact remaining in the female die, the mixture for the silicon-carbon compact can be placed on top of the silicon carbide-carbon compact and the silicon-carbon mixture then pressed into a layer adherent to the silicon carbide-carbon bottom layer after which the resulting composite compact is removed from the die. This technique is advantageous for high production operations in that it eliminates the need subsequently to stack one compact on top of the other and it assures that the two compacts which form the assembly are assembled and remain assembled precisely as desired.

The assembly of the compacts is then heated to a temperature sufficient to decompose the binder. This heating step can be performed in air though it is better that it be in a non-oxidizing atmosphere such as a mixture of nitrogen and hydrogen, 85% by volume nitrogen and 15% by volume hydrogen being excellent. During the decomposition, at least most of the carbon atoms in the binder will remain as carbon in the compact and the other ingredients in the binder, for example hydrogen and oxygen, leave the compact in gaseous or vapor form. In general, the temperature used for this heating operation to decompose the binder can be from about 300° to 450° C., the precise temperature and time for this operation depending upon the particular binder used. Where the binder is polyethylene glycol, heating to a temperature of 375° C. for one hour in a nitrogen-hydrogen atmosphere is quite satisfactory.

After the binder has been decomposed as aforesaid, the assembly is heated to a temperature at least equal to the melting temperature of the silicon in an inert atmosphere or in a vacuum, preferably the latter. Of course, the higher the vacuum the better; a vacuum of from $1 \times 10^{-2}$ to $1 \times 10^{-1}$ mm Hg provides excellent results. If it is desired to use an inert atmosphere, it is preferable to use a higher temperature than required with the use of a vacuum in order to obtain optimum, relatively rapid infiltration of the molten silicon through the silicon carbide-carbon compact. Suitable inert atmospheres are argon, helium, and hydrogen. The latter, though it may function as a reducing atmosphere with respect to any oxide contaminant as might be present, is inert with respect to the essential ingredients. The preferred temperature and time used, particularly where the heating is in a vacuum, are from 1450° to 1650° C. for from one-half to six hours, the precise temperature and time being dependent on the thickness of the body being made and the porosity of the silicon carbide-carbon compact. In general, the greater the thickness and the lesser the porosity, the higher the temperature and the greater the time used for this operation. Typically, for a body having a thickness of one-half inch made from a silicon carbide-carbon compact having a bulk density of about 1.8 grams per cubic centimeter, heating in a vacuum to a temperature of 1500° C. for two hours is satisfactory. If an inert atmoshpere is used, temperatures as high as 2000° C. may be desirable to attain optimum infiltration within a short period.

During this heating operation, by or at the time the silicon becomes molten, a portion thereof reacts with the carbon in the silicon-carbon compact to form silicon carbide. This silicon carbon forms a highly porous, friable matrix which functions to contain and guide the flow of the remaining silicon, now in molten form, into the porous silicon carbide-carbon compact. That is, the friable porous matrix prevents or inhibits flow of the molten silicon over the edge and down the sides of the silicon carbide-carbon compact. As the molten silicon infiltrates the silicon carbide-carbon compact, a portion thereof reacts with the carbon in that compact to form additional silicon carbide and, after all of the carbon has reacted to form silicon carbide, any remaining pores are filled with the elemental silicon. Hence, the resulting body is of high strength, unitary, reaction bonded silicon carbide with the pores thereof filled with silicon to provide a substantially non-porous structure.

After the infiltration is complete and the resulting body removed from the heating chamber and cooled, the friable silicon carbide matrix, along with any excess silicon on the surface of the body, can be easily removed by a simple abrading or machining operation. Where seal rings are being manufactured, this operation is then followed by a polishing operation to provide the desired smooth surface finish for the seal ring, preferably a surface finish of less than 60 microinches (root mean square).

Hence, by means of the invention, silicon carbide-silicon seal rings and other bodies can be made to substantial non-porosity and at a relatively low manufacturing cost.

It is desirable during the heating operation that the assembly of compacts be oriented vertically with the silicon carbide-carbon compact on the bottom and the silicon-carbon compact on top since with this orientation the molten silicon flows into and permeates through the silicon carbide-carbon compact both by reason of capillary action and by reason of gravity. However, since the molten silicon can flow into the silicon carbide-carbon compact solely by way of capillary action, the aforesaid orientation of the assembly is not essential. Further, whereas there is generally no reason to use an assembly of more than two compacts, it is possible to do so if desired—an example being a silicon carbide-carbon compact sandwiched between two silicon-carbon compacts.

In all of the embodiments of the invention described above, the mixture of elemental silicon and carbon is used in the form of a compact thereof, made as by the technique described wherein a binder is included in the mixture and the mixture is pressed to form the compact. This use of the silicon-carbon mixture in the form of a compact thereof is preferred; however, it is not essential for the practice of the invention in its broader scope. That is, it is within the purview of the invention to use the silicon-carbon mixture for the practice of the invention in a loose powder form and hence without need for a binder therein. In so practicing the invention the finely divided silicon and carbon are mixed to form the desired uniform mixture thereof in non-compacted loose form and then the desired quantity of this loose particulate mass can be poured onto and around the silicon carbide-carbon compact. Where the silicon carbide-carbon compact is a ring, it is desirable that most of the loose silicon-carbon mixture be placed in the center and around the faces of the ring, and hence in intimate surface-to-surface contact with the ring. From then on the method is the same as has been described, the silicon carbide-carbon compact being heated, while in such contact with loose mass, to the melting temperature of the silicon. The particle sizes and percentages of the powdered elemental silicon and carbon, and the form of carbon, used in the loose mixture can be as described above with reference to the embodiments wherein the mixture is used in the form of a compact thereof.

As has been discussed above, the method of the present invention serves to particular advantage for the manufacture of substantially non-porous bodies wherein any interstitial voids between the carbide grains are filled with elemental silicon and indeed, excellent bodies can be manufactured containing as little as about 60% by weight silicon carbide and the remainder elemental silicon. However, it will be understood that the invention can be used to form bodies wherein there is little or no free silicon, this being accomplished by using only that amount of silicon as is stoichiometrically required to react with the carbon.

Hence, it will be understood that while the invention has been described particularly with reference to preferred embodiments thereof, various changes may be made all within the full and intended scope of the claims which follow.

What is claimed is:

1. A method for manufacturing a reaction bonded silicon carbide body comprising: heating, in a vacuum or an inert atmosphere, to at least the melting temperature of elemental silicon, a porous compact consisting essentially of a uniform mixture of silicon carbide grain and finely divided elemental carbon while said compact is in contact with a mixture of finely divided elemental silicon and a small amount of finely divided uniformly distributed elemental carbon, whereby upon said heating a portion of the elemental silicon in the silicon-carbon mixture reacts with the carbon in said silicon-carbon mixture to form a friable, porous matrix of silicon carbide which guides the flow of molten elemental silicon from the mixture into said porous compact wherein at least some of the molten silicon reacts with the carbon in said compact to form additional silicon carbide thereby to provide a reaction bonded silicon carbide body.

2. A method as set forth in claim 1 wherein the amount of elemental silicon in said silicon-carbon mixture is in excess of that stoichiometrically required to react with the total of the carbon in said silicon-carbon mixture and in said compact and sufficient to fill any interstitial voids in the reaction bonded silicon carbide body.

3. A method as set forth in claim 1 wherein said silicon-carbon mixture is in the form of a compact thereof.

4. A method for manufacturing a reaction bonded silicon carbide body comprising:
    (1) forming an assembly of two compacts in contact with each other, one of said compacts consisting essentially of a uniform mixture of from about 70% to 95% by weight silicon carbide grain and the remainder finely divided elemental carbon and the other of said compacts consisting essentially of a uniform mixture of from about 87% to 97% by weight finely divided elemental silicon and the remainder finely divided elemental carbon;
    (2) heating said assembly in a vacuum or an inert atmosphere to the melting temperature of silicon whereby a portion of said elemental silicon reacts with the carbon in said second-mentioned compact to form a friable, porous, silicon carbide matrix and whereby the remainder of said silicon permeates said first-mentioned compact wherein at least a portion of said silicon reacts with the carbon in said first-mentioned compact such that said first-mentioned compact is converted to a reaction bonded silicon carbide body; and
    (3) thereafter removing said friable, porous, silicon carbide matrix from said reaction bonded carbide body.

5. A method as set forth in claim 4 wherein the amount of elemental silicon in said second-mentioned compact is in excess of that stoichiometrically required to react with all the carbon in both of said compacts and sufficient to fill any interstitial voids in the reaction bonded silicon carbide body.

6. A method as set forth in claim 5 wherein said first-mentioned compact has a porosity such that from about 20% to 50% by volume of said compact consists of voids.

7. A method for manufacturing a reaction bonded silicon carbide body comprising:
    (1) forming an assembly of two compacts in contact with each other, one of said compacts consisting essentially of a uniform mixture containing from about 75 to 95 parts by weight silicon carbide grain, from about 5 to 25 parts by weight finely divided elemental carbon and from about 5 to 15 parts by weight organic binder and the other of said compacts consisting essentially of a uniform mixture containing from about 90 to 97 parts by weight finely divided elemental silicon, from about 3 to 10 parts by weight finely divided elemental carbon and from about 3 to 10 parts by weight organic binder;
    (2) heating said assembly to a temperature sufficient to decompose the organic binder in said compacts;
    (3) heating said assembly in a vacuum or an inert atmosphere to the melting temperature of said silicon whereby a portion of said silicon reacts with the carbon in said second-mentioned compact to form a friable, porous, silicon carbide matrix and whereby the remainder of said silicon permeates said first-mentioned compact wherein at least a portion of said silicon reacts with the carbon in said first-mentioned compact such that said first-mentioned compact is converted to a reaction bonded silicon carbide body; and
    (4) thereafter removing said friable, porous, carbide matrix from said reaction bonded silicon carbide body.

8. A method as set forth in claim 7 wherein said first-mentioned compact has a porosity such that from about 20% to 50% by volume of said compact consists of voids.

9. A method as set forth in claim 7 wherein the amount of silicon in said first-mentioned compact is sufficient to react with all the carbon in both of said compacts and to fill any voids in said reaction bonded body.

10. A method as set forth in claim 7 wherein said first-mentioned heating of said assembly is to a temperature of from about 300° to 450° C. and wherein said second-mentioned heating is to a temperature of from about 1450° to 1650° C. in a vacuum.

11. A method as set forth in claim 7 wherein said silicon carbide has a grain size of from 200 to 1200 grit, wherein said carbon has a submicron particle size and wherein said silicon has a particle size of from 100 to 325 mesh.

12. A method for manufacturing a body containing at least about 60% by weight silicon carbide and the remainder substantially all elemental silicon, said method comprising heating, in a vacuum or an inert atmosphere, to at least the melting temperature of elemental silicon for from one-half to six hours, a compact having a porosity such that from about 20% to 50% by volume thereof consists of voids, and consisting essentially of a uniform mixture of from about 70% to 95% by weight silicon carbide grain and from about 5% to 30% by weight finely divided elemental carbon, said heating being performed while said compact is in contact with a uniform mixture of from about 87% to 97% by weight finely divided elemental silicon and the remainder finely divided carbon, the amount of elemental silicon being greater than that stoichiometrically required to react with the total of the carbon in said silicon-carbon mixture and in said compact.

13. A method as set forth in claim 12 wherein said mixture of silicon and carbon is in the form of a compact thereof.

14. A method as set forth in either claim 1 or 12 wherein the silicon-carbon mixture is in non-compacted loose form.

* * * * *